US012664684B2

(12) United States Patent
Aguirre et al.

(10) Patent No.: US 12,664,684 B2
(45) Date of Patent: Jun. 23, 2026

(54) HUMAN-ROBOT INTERACTIVE WORKSPACE

(71) Applicant: Intel Corporation, Santa Clara, CA (US)

(72) Inventors: David Gonzalez Aguirre, Portland, OR (US); Javier Felip Leon, Hillsboro, OR (US); Javier Felix Rendon, Tlajomulco de Zuniga (MX); Arturo Tellez Velazquez, Huajuapan de Leon (MX)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 17/957,529

(22) Filed: Sep. 30, 2022

(65) Prior Publication Data

US 2024/0112369 A1     Apr. 4, 2024

Related U.S. Application Data

(60) Provisional application No. 63/410,520, filed on Sep. 27, 2022.

(51) Int. Cl.
| | |
|---|---|
| *G06T 7/80* | (2017.01) |
| *B25J 9/16* | (2006.01) |
| *G06T 7/70* | (2017.01) |
| *H04N 17/00* | (2006.01) |

(52) U.S. Cl.
CPC .............. *G06T 7/80* (2017.01); *B25J 9/1692* (2013.01); *B25J 9/1697* (2013.01); *G06T 7/70* (2017.01); *H04N 17/002* (2013.01); *G06T 2207/30244* (2013.01)

(58) Field of Classification Search
CPC ... G06T 7/80; G06T 7/70; G06T 2207/30244; B25J 9/1692; B25J 9/1697; H04N 17/002; G05B 2219/39024; G05B 2219/40202
USPC ........................................................ 382/153
See application file for complete search history.

(56) References Cited

U.S. PATENT DOCUMENTS

2019/0105779 A1* 4/2019 Einav ..................... B25J 9/1689

OTHER PUBLICATIONS

Apriltag: A robust and flexible visual fiducial system, IEEE International Conference on Robotics and Automation, (2011) (Year: 2011).*
"Estimating the Homography Matrix with the Direct Linear Transform (DLT)", [Online]. Retrieved from the Internet: URL: https: medium.com @insight-in-plain-sight estimating-the-homography-matrix-with-the-direct-linear-transform-dlt-ec6bbb82ee2b, (Apr. 6, 2022).

(Continued)

*Primary Examiner* — Stephen P Coleman
(74) *Attorney, Agent, or Firm* — Banner & Witcoff, Ltd.

(57) ABSTRACT

Various aspects of techniques, systems, and use cases include provide instructions for calibrating or object identification in a human-robot interactive environment. A technique may include displaying a back illumination image having at least two distinct sections, capturing a scene including the first back illumination image and an object obstructing a portion of one of the at least two distinct sections of the first back illumination image, and identifying, using an orientation of the display screen relative to the camera (e.g., obtained via calibration), location information of the object relative to a robotic device based on the first scene. The technique may include outputting the location information.

22 Claims, 9 Drawing Sheets

(56) References Cited

OTHER PUBLICATIONS

Choi, Sung Ho, "An XR-based Approach to Safe Human-Robot Collaboration", IEEE Conference on Virtual Reality and 3D User Interfaces Abstracts and Workshops (VRW), [Online]. Retrieved from the Internet: URL: https: ieeexplore.ieee.org document 9757621, (2022).

Felip, Javier, "Intuitive and Efficient Human-robot Collaboration via Real-time Approximate Bayesian Inference", [Online]. Retrieved from the Internet: URL: https: arxiv.org abs 2205.08657, (2022), 7 pgs.

Knight, W., "How Human-Robot Teamwork Will Upend Manufacturing", MIT Technology Review, [Online]. Retrieved from the Internet: URL: https: www.technologyreview.com 2014 09 16 171369 how-human-robot-teamwork-will-upend-manufacturing , (Sep. 14, 2019), 7 pgs.

Lagomarsino, Marta, "Pick the Right Co-Worker: Online Assessment of Cognitive Ergonomics in Human-Robot Collaborative Assembly", IEEE Transaction on Cognitive and Developmental Systems, [Online]. Retrieved from the Internet: URL:https: ieeexplore. ieee.org stamp stamp.jsp?tp=andarnumber=9795908andtag=1, (2022), 10 pgs.

Park, Kyeong-Beom, "Indirect Robot Manipulation using Eye Gazing and Head Movement For Future of Work in Mixed Reality", IEEE Conference on Virtual Reality and 3D User Interfaces Abstracts and Workshops (VRW), [Online]. Retrieved from the Internet: URL: https: ieeexplore.ieee.org document 9757386, (2022).

Song, Young Eun, "Multimodal multi-user human-robot interface for virtual collaboration", [Online]. Retrieved from the Internet: URL:https: ieeexplore.ieee.org stamp stamp.jsp?arnumber= 6462920, (2021).

Suzuki, Ryo, "Augmented Reality and Robotics: A Survey and Taxonomy for AR-enhanced Human-Robot Interaction and Robotic Interfaces", [Online]. Retrieved from the Internet: URL: https: dl.acm. org doi 10.1145 3491102.3517719, (2022), 1-33.

* cited by examiner

100

102

104

108

106

110

200

PHYSICAL PATTERN
ON THE SCREEN IN
THE SCENE $X_w$

WORKBENCH
COORDINATE
SYSTEM $Y_w$ $Z_w$ $X_i$ $Y_i$

O

X

Y

CAMERA IMAGE
PLANE f $Z_c$ $X_c$

CAMERA
COORDINATE
SYSTEM $Y_c$

C

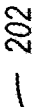
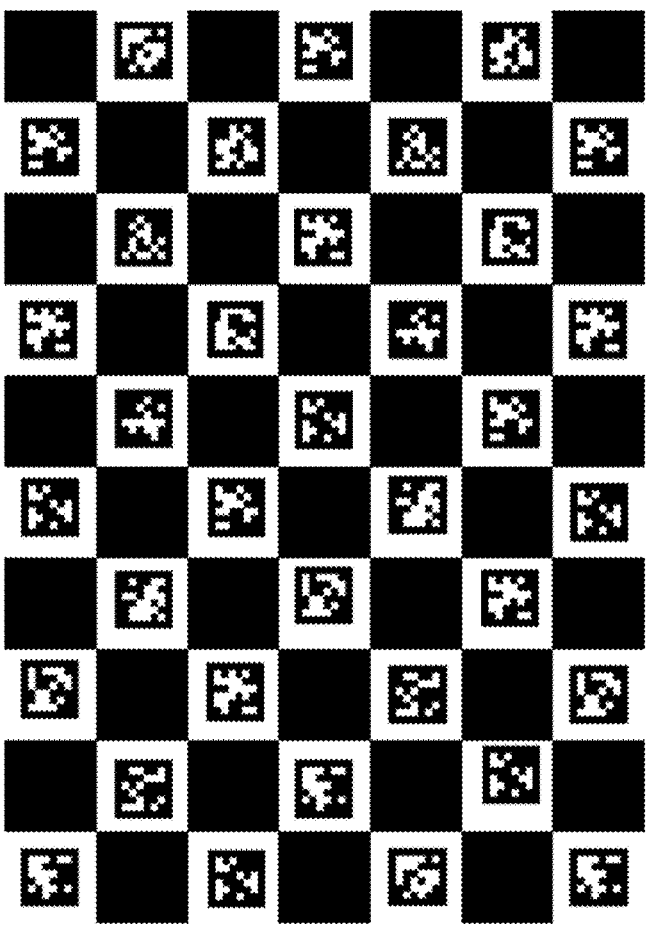
*FIG. 2B*

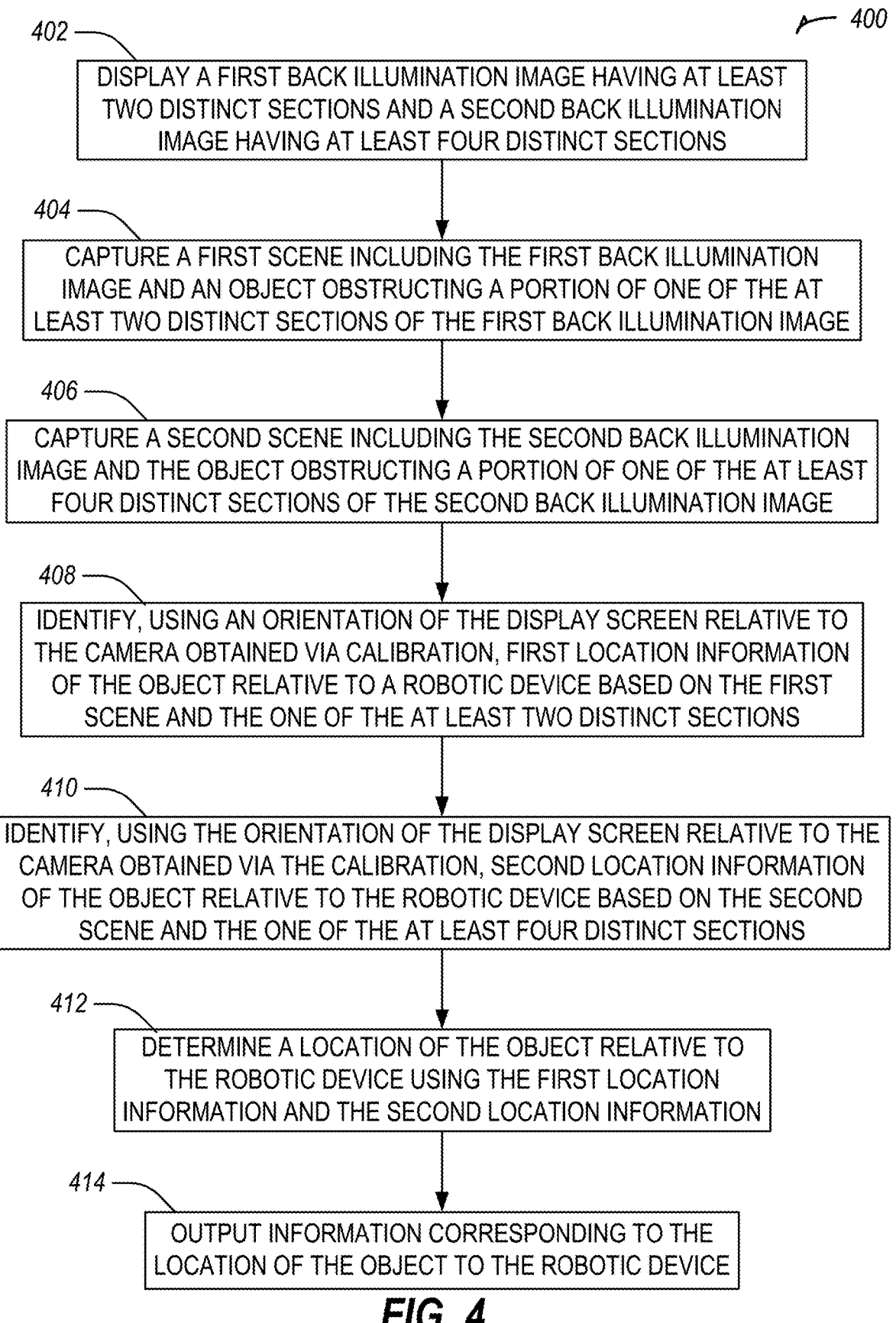

402 —
DISPLAY A FIRST BACK ILLUMINATION IMAGE HAVING AT LEAST TWO DISTINCT SECTIONS AND A SECOND BACK ILLUMINATION IMAGE HAVING AT LEAST FOUR DISTINCT SECTIONS

404 —
CAPTURE A FIRST SCENE INCLUDING THE FIRST BACK ILLUMINATION IMAGE AND AN OBJECT OBSTRUCTING A PORTION OF ONE OF THE AT LEAST TWO DISTINCT SECTIONS OF THE FIRST BACK ILLUMINATION IMAGE

406 —
CAPTURE A SECOND SCENE INCLUDING THE SECOND BACK ILLUMINATION IMAGE AND THE OBJECT OBSTRUCTING A PORTION OF ONE OF THE AT LEAST FOUR DISTINCT SECTIONS OF THE SECOND BACK ILLUMINATION IMAGE

408 —
IDENTIFY, USING AN ORIENTATION OF THE DISPLAY SCREEN RELATIVE TO THE CAMERA OBTAINED VIA CALIBRATION, FIRST LOCATION INFORMATION OF THE OBJECT RELATIVE TO A ROBOTIC DEVICE BASED ON THE FIRST SCENE AND THE ONE OF THE AT LEAST TWO DISTINCT SECTIONS

410 —
IDENTIFY, USING THE ORIENTATION OF THE DISPLAY SCREEN RELATIVE TO THE CAMERA OBTAINED VIA THE CALIBRATION, SECOND LOCATION INFORMATION OF THE OBJECT RELATIVE TO THE ROBOTIC DEVICE BASED ON THE SECOND SCENE AND THE ONE OF THE AT LEAST FOUR DISTINCT SECTIONS

412 —
DETERMINE A LOCATION OF THE OBJECT RELATIVE TO THE ROBOTIC DEVICE USING THE FIRST LOCATION INFORMATION AND THE SECOND LOCATION INFORMATION

414 —
OUTPUT INFORMATION CORRESPONDING TO THE LOCATION OF THE OBJECT TO THE ROBOTIC DEVICE

HUMAN-ROBOT INTERACTIVE WORKSPACE

PRIORITY APPLICATION

This application claims the benefit of priority to U.S. Provisional Application Ser. No. 63/410,520, filed Sep. 27, 2022, which is incorporated herein by reference in its entirety.

BACKGROUND

Robots and other autonomous agents may be programmed to complete complex real-world tasks. Robotics use artificial intelligence (AI) to perform tasks in industrial environments. Robotics span a wide range of industrial applications, such as smart manufacturing assembly lines, multi-robot automotive component assembly, computer and consumer electronics fabrication, smart retail and warehouse logistics, robotic datacenters, etc. Often robots interact with humans to complete tasks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 2A-2B illustrate a calibration pattern and projection according to an example.

FIGS. 3A-3B illustrate object detection flow diagrams according to an example.

FIG. 4 illustrates a flowchart showing a technique for calibrating or performing object identification in a human-robot interactive environment according to an example.

DETAILED DESCRIPTION

Figure 1A:
FIG. 1A-1B illustrate a human-robot collaborative system in various views according to an example.

Systems and techniques described herein provide a human-robotic interactive workspace. These systems and techniques may be used to automatically calibrate the workspace by determining an alignment of a camera and a robot, for example to a table. The camera may be used to capture information about objects on the table, information about a human interacting within the workspace, or information about a location of the robot within the workspace.

The automation of industrial processes in high-mix low-volume (HMLV) tasks may include splitting the work between a collaborative robot (Cobot) and a human. This collaboration introduces a problem of designing usability and intuitive human-robot collaborative workbenches. The technical problem of integrating a user interface that enables programmability, control, and task monitoring is solved by the technological solutions described herein, by closing the loop between 3D-vision and active-displays.

The systems and techniques described herein may be used to transform Cobot workbenches into enhanced 3D active-sensing and intuitive digital twin interfaces while reducing deployment cost and tackling calibration complexity. The systems and techniques described herein may be used to amplify productivity in both autonomous and collaborative task-execution modes. The systems and techniques described herein may be used to improve the Information Displaying Process (IDP) and enhance the Robot-centric Object Recognition (ROR) processes with respect to dependability, performance, or lower-cost compared with touchscreen, LiDAR, or multicamera systems. The display surface may be leveraged as an active perception component, by displaying adaptively generated images as a structured high-resolution back-projector with precise lighting and chromatic capabilities.

Existing collaborative human-robot interfaces suffer from multiple efficiency limitations and deployment restrictions while also increasing cognitive load of users during task co-execution. The result of current approaches is cost- and operational-ineffective non-ruggedized, and sub-utilized instrumentation. Moreover, most human-robot interfaces are only exploited either during programming or in-production but fail to perform self-calibration. This is particularly acute on Cobot production cells where (re)-programming-by-demonstration is required frequently due to the inherent application scope in so-called high-mix low volume processes. This shortcoming occurs because sensing and display instrumentation are mutually decoupled for the Information Display Process (IDP) or the Robot-centric Object Recognition (ROR). The smart-vision Cobot-workbench described herein provides a Cobot-centric bidirectional vision viewport between the robot workspace and its digital twin showcasing the dependable solution to the problem previously discussed.

A human-robot interactive workspace as described in the systems and techniques herein may be used in various industrial, factory, warehouse, or other locations. For example, the workspace and the systems and techniques described herein may be used in CNC manufacturing, visual inspection, assembling, food packing, 3D printing and extracting, food, chemicals, or the like.

Figure 1B:

FIG. 1A-1C illustrate a human-robot collaborative system in various views according to an example. FIG. 1A illustrates a camera 102 to capture a scene 100, including a robot 104 and an interactive display 106. The camera 102 may have a field of view 108, such as to capture all of the interactive display 106, and optionally a portion of the robot 104 (e.g., a base). An area 110 of the interactive display 106 may be illuminated. FIG. 1B shows a simplified view of the scene 100 without the camera. FIG. 1B includes an object 112, which may be detected using the camera 102 and the area 110.

The interactive display 106 may be used as a human-robot collaboration interface for a Cobot-workbench. The interactive display 106 may be used to display global or local structured images as contrastive light sources with pixel-level granularity and low-latency (e.g., 120 Hz). In some examples, the surface of the interactive display 106 may be covered with transparent polymer (e.g., transparent plexiglass) to protect against erroneous grasps or collisions by the robot 104, preventing damage to the interactive display 106. The interactive display 106 may display binary or phase encodings, as described below. The robot 104 may detect occupancy, location, or orientation of an object (e.g., object 112) by direct adaptive illumination to the supporting plane on the interactive display 106. This detection may be used under harsh industrial conditions with any camera type (e.g., high-end RGBD, low-priced monocular grayscale camera, etc.), such as in processes with dirt, dust, or other sensing or instrumentation challenges.

The signal and geometric processes of the human-robot collaborative system allow the placement of a camera on high ceilings (e.g., in factories or warehouses) at further distances than any existing RGBD ranging sensor, for example. The processes may be used to deliver better sampling density that a LiDAR by using long focal lengths. The camera 102 may include a grayscale, RGB, or RGBD camera. The interactive display 106 may include a computer attached screen with HD resolution or higher depending on the minimal size of object to be manipulated or identified by the robot 104. In some examples, a 1920×1080 pixel screen may be used with objects of 9-12 mm with a camera at 1.2-1.4 meters using VGA camera resolution. A computer may be connected (e.g., via a network) with the camera 102, the interactive display 106, or the robot 104.

The camera 102 and the interactive display 106 may be used to trigger and capture the scene 100, calibrate a geometric or pixel-to-millimeters relationships between the interactive display 106 and camera 102, access a joint-state of the robot 104 and its 3D model to enable visual feedback of configuration states (e.g., current or target state), or coordinate a visual perception pipeline with graphic-geometric algorithms to generate, adapt, or manage the images on the screen allowing effective detection and recognition of objects. The resulting binary or phase modulated algorithms may be used to determine and output an object position without camera depth signal by exploiting the structured intensity encoding displayed on the interactive display 106, as described below. The camera 102, the robot 104, and the interactive display 106 may be self-calibrating, which reduces time and cognitive workload for multiple simultaneous users. The self-calibration allows the system to be deployed without a technical setup.

Figure 2A:
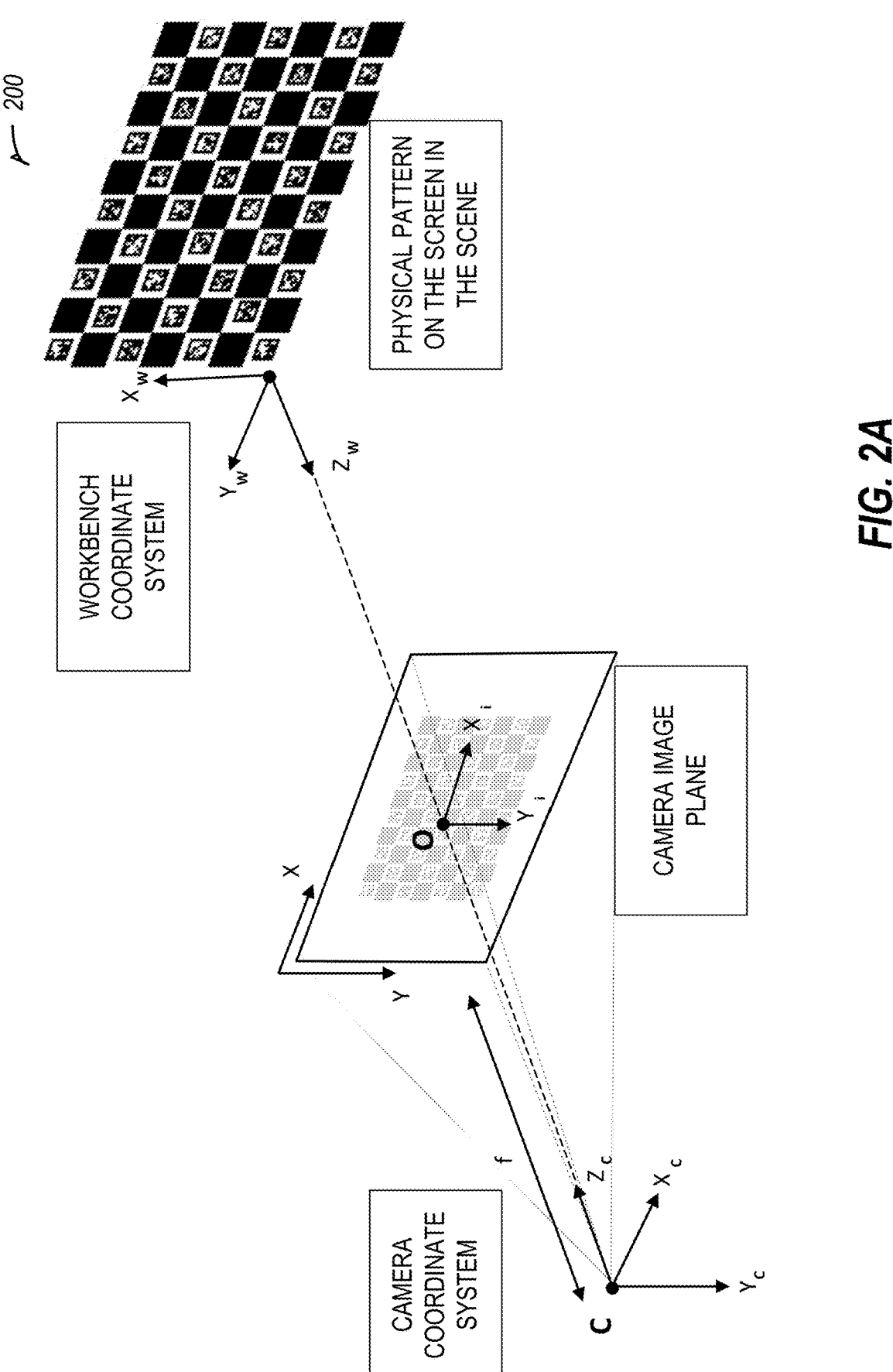

FIGS. 2A-2B illustrate a calibration pattern and projection according to an example. FIG. 2A illustrates a set of coordinate systems for a human-robot collaborative system (e.g., as shown in FIGS. 1A-1B). FIG. 2B illustrates a chess board pattern with embedded 2D binary codes corresponding to numeric identifiers (not shown), and a 2D-orientation for each code.

The calibration pattern may be used to orient a camera (e.g., having a camera coordinate system) to a display screen (e.g., having a workbench coordinate system). To generate images which are geometrically consistent and produce high signal to noise ratio, a 3D view port may be implemented using a scene-graph. This ensures the virtual camera on top of the screen displays orthogonal (top-view) renders off the assets without perspective distortions. The dimensions of the monitor (in mm) and its resolution may be used to create the projection composed by scaling and translation. With this projection, any (generated or pre-computed) image or mesh may be displayed on the screen with a 1:1 orthogonal consistency. The display triggering may be done by a call-back of the render before the buffer is sent to a graphic driver, to provide high-precision timing between rendering and camera triggering to avoid sync issues. This is important when temporal fusion is applied to remove shiny effects, such as caused by protective transparent plexiglass on the screen or a shiny object.

The calibration pattern may be used for online camera self-calibration. The intrinsic and extrinsic parameters of the camera may be estimated by capturing an image displayed on a screen (e.g., the interactive display 106 of FIGS.

1A-1B). A robust optimization method may be used with known screen dimensions to enable the online calibration.

The calibration may include displaying full screen with full intensity $I_{m(x,y)} \to \alpha$, and capturing an associated picture $I_{\{c_{m(x,y)} \to \alpha\}(u,v)}$. The intensity may be decrease, for example according to $$\alpha := \frac{\alpha}{2}.$$

This step may be repeated, for example three to seven times depending on lighting conditions. This may result in a set of pictures (e.g., three to seven), and may be completed within 500 ms (e.g., suitable to occur at idle times). When $\alpha$ is below $\beta$ acquisition may be concluded, otherwise the process may be repeated. $\beta$ may be set according to a threshold (e.g., a resolution threshold, a time threshold, a calibration accuracy threshold, etc.).

The images may be stacked, $I_{\{c_{m(x,y)} \to \alpha\}(u,v)}$ and the mask image may be obtained where the intensities decay in the same half-down progression $I_{\delta(u,v)} \to \{0|1\}$. Pixel outliers may be removed by region growing rejecting all segments $\omega_i \subset I_{\delta(u,v)}$ under a minimal pixel count h. This may result in a new version of $\hat{I}_{\delta(u,v)}$ with fewer $\omega_i$. This allows internal gaps in the segments, which provides for the presence of objects on the surface partially covering some areas of the screen. This way online recalibration may be triggered even with the presence of production tools or objects without stopping the workflow.

The convex hull of each segment may be computed, and any remaining segment not in a quadrilateral hierarchy may be rejected. Remaining regions represent parts of the image where the display is visible by the camera. This may be used to address the variability of camera position and dynamic scene content.

Binary pattern images $I_{\varphi(u,v)} \to \{0|1\}$ may be displayed in a checker pattern in the calibration image. Corners ($P_k \in R^2$) of the calibration image may be extracted. Because the pattern is known, corner orders (left-top, bottom-right, etc.) may be detected, and the corners may be remapped in the camera coordinate system in the left-to-right and top-down order $\check{P}_k$. Multiple identifying patterns may be present in white check regions to allow occlusions.

The 6D pose of the screen may be determined in two stages. First the homography H may be estimated via a direct linear transform. Then, because the camera is static in the environment, a stationary intrinsic camera parameter may be used (e.g., a fixed focal length and principal point). The projection matrix P may be formed from this information. The extrinsic camera frame E may be found from H=sPE. Given a physical scale s and via optimization search for translation and rotation (e.g., ensuring orthogonality in a rotation submatrix) the frame $R_w \to E$ may be iteratively estimated.

Once known from the above steps, the intrinsic and extrinsic parameters of the vision system may be used to transform the quadrilateral image of the calibration image to a reference 2D image (as shown in FIG. 2A as camera image plane) from an invariant point of view and a millimeter to pixel factor for each axis, namely $I_{s(x,y)}$ and $\sigma_x$ and $\sigma_y$.

Composition of a robot including active joints and mapping to names in a ROS network may be obtained. For example, the Unified Robot Description Format (URDF) may be used to represent a robot model standard, and the composition, joints, or mapping may be determined from a URDF file. Using this or another framework allows for the creation of 3D kinematic chains in the scene graph. The kinematic chains may be used with visualization from an orthographic camera to synthesize real-time renders, making the 1:1 time and space registration of visuals with the state of the robot. A semitransparent secondary kinematic chain may be rendered for a target position or trajectory producing visual cues for a user to identify a current or next state of the robot. This may allow the user to assert a goal or state of the robot program rapidly and free of ambiguity.

Figure 3A:
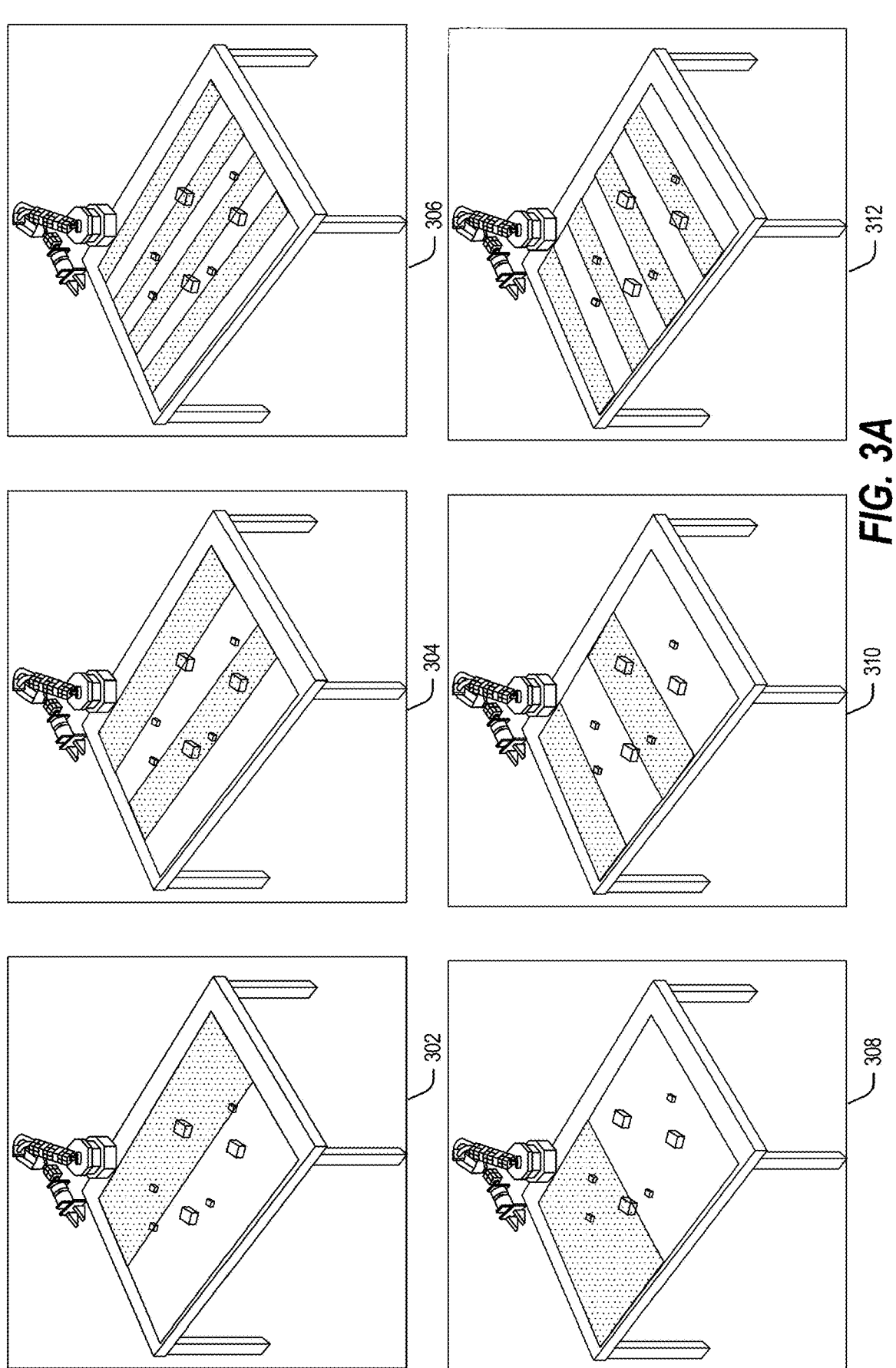
Figure 3B:
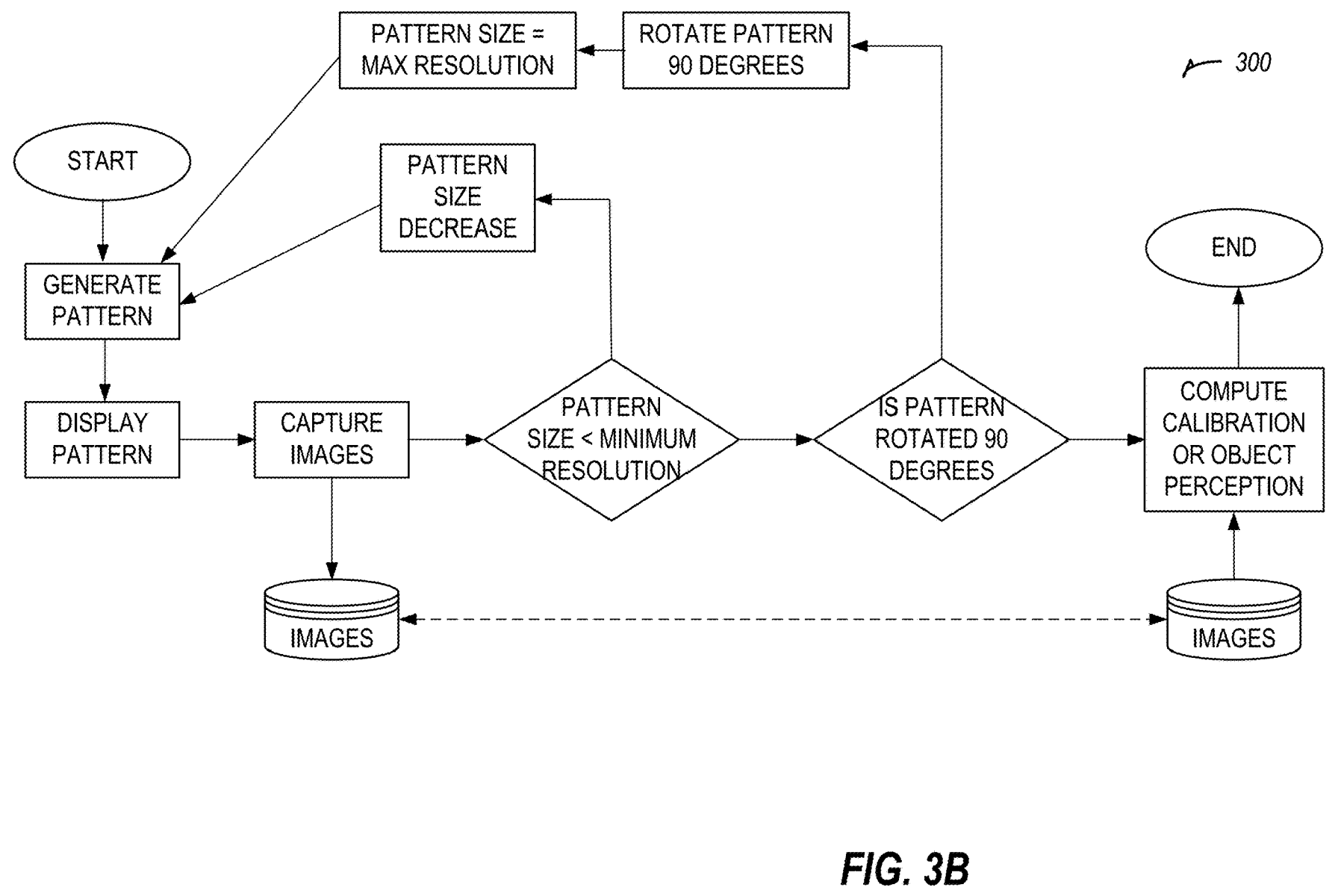

FIGS. 3A-3B illustrate object detection flow diagrams according to an example.

With the technical elements described above, physical space may be linked with visual space (e.g., a display surface, robot location, etc. to a camera). Projective background patterns may be used to provide a reference to determine location, shape, or orientation of an object on a workbench. In some examples, a binary or phase pattern modulation may be used, as shown in FIG. 3A. The workflow corresponding to the pattern changes of FIG. 3A is shown in FIG. 3B. A reference pattern may be displayed and captured by a camera. The captured image may be used with knowing details of the reference pattern to determine a region where content differs from the expectation of the reference pattern. The location changes may be determined from coarse to fine (e.g., coarse shown in boxes 302 and 308, medium in boxes 304 and 310, and fine detail in boxes 306 and 312).

As shown in FIG. 3A, parts of the display that are not visible by the camera encode information about the objects position and shape. The encoding may be performed in steps, for example from 302 to 312, to determine where there may be objects. By doing this process in $2^{-n}$ fashion with n steps in the pattern size, the pixel or bitwise state of the surface is captured. The spatial location may be obtained from the pixel or bitwise state. In some examples, n=[e.g., 4–12] steps may be used, based on how well a camera and display are synchronized (e.g., as determined above). The 3D sensing of objects on the display may run up to 10 Hz with granularity of up to 3-5 mm for the shape of the objects, in some examples. This may be done from distances up 8-10 meters away or greater, with long focal lengths. This 3D vision active display process illustrates the steps to capture the images and generate patterns to enable human-robot interfaces and enhanced vision capabilities.

An example of binary pattern is displayed as back illumination in FIG. 3A. An object on the screen surface may be detected (e.g., obtained with orientation or location information) using the back illumination. Because the screen can display a highly-synchronized frame rate with the camera, in some examples 120 different patterns per second or less with modulations from half of the resolution up to a single pixel row or column may be performed.

The process shown in FIG. 3B starts with generating a pattern, displaying the pattern on a display screen, capturing an image (including portions of the pattern displayed on the display screen), and determining whether the pattern size is below a threshold (e.g., a minimum resolution). Captured images may be stored (e.g., in a database), or otherwise output. When the pattern size is not below a minimum, the above steps may be repeated (e.g., pattern size decrease column or row width, or increase number of pattern columns or rows). When the pattern size falls below the threshold, the steps may include rotating the pattern 90 degrees. For example, the steps may go from 302 to 306 in FIG. 3A, and then rotate 90 degrees to go from 308 to 312. After rotation, the pattern size may be reset to a maximum resolution, and the stepwise reduction may recur at the 90 degree angle. After all images are captured, calibration or object perception may be computed using the captured images. In some examples, information about calibration or objects may be stored or computed during the process shown in FIG. 3B (e.g., after capture of an image, a rough location may be determined, to be further refined as the steps iterate.

While a binary encoding is shown in FIG. 3A, other encodings may be used, such as a phase intensity or chroma encoding, for example with images that are black and white or color patterns, optionally with variable gradient in multiple ways, colors, intensities, saturations, etc. If an object is too large and overlaps the binary encodings at even the largest resolution, then the object may not be resolvable, but a bounding box of the object may still be determined.

FIG. 4 illustrates a flowchart showing a technique 400 for calibrating or object identification in a human-robot interactive environment according to an example. The technique 400 may be performed by a device or devices in an edge or datacenter network (e.g., an orchestrator, a base station, a server, a mobile device, an IoT device, or the like), by an AMR, etc.

The technique 400 includes an operation 402 to display a first back illumination image having at least two distinct sections and a second back illumination image having at least four distinct sections. The at least two distinct sections and the at least four distinct sections may include a binary encoding (e.g., for the at least two distinct sections, an illuminated section and an unilluminated portion, or for the at least four distinct sections, two illuminated sections alternating with two unilluminated portions). In other examples, the distinct sections may include a phase intensity or chroma encoding, for example with images that are black and white or color patterns, optionally with variable gradient in multiple ways, colors, intensities, saturations, etc.

The technique 400 includes an operation 404 to capture a first scene including the first back illumination image and an object obstructing a portion of one of the at least two distinct sections of the first back illumination image. The technique 400 includes an operation 406 to capture a second scene including the second back illumination image and the object obstructing a portion of one of the at least four distinct sections of the second back illumination image.

The technique 400 includes an operation 408 to identify, using an orientation of the display screen relative to the camera obtained via calibration, first location information of the object relative to a robotic device based on the first scene and the one of the at least two distinct sections. In an example, the robotic device may be a collaborative robotic device including at least one safety control for interacting in the human-robotic shared environment. The human-robotic shared environment may support use with multiple users without needing additional devices per user.

The technique 400 includes an operation 410 to identify, using the orientation of the display screen relative to the camera obtained via the calibration, second location information of the object relative to the robotic device based on the second scene and the one of the at least four distinct sections.

The technique 400 includes an operation 412 to determine a location of the object relative to the robotic device using the first location information and the second location information. Operation 412 may include using third location information of the object relative to the robotic device based on a third scene including a third back illumination image and the object obstructing a portion of one of at least eight distinct sections of the third back illumination image. The technique 400 includes an operation 414 to output information corresponding to the location of the object to the robotic device.

The technique 400 may include displaying a calibration image, and capturing a third scene including the robotic device, the calibration image, and the object obstructing a first portion of the calibration image. In this example, the orientation may be determined by determining the orientation of the display screen relative to the camera based on a second portion of the calibration image that is unobstructed. This example may further include recalibrating the camera to the display device by displaying a second calibration image and capturing a second scene including the second calibration image and a second object obstructing a third portion of the second calibration image. The recalibration may include determining a second orientation of the display screen relative to the camera based on a fourth portion of the second calibration image that is unobstructed.

The technique 400 may include determining a location of a second object, having a different size (or 6D pose, e.g., x, y, z, roll, pitch, or yaw) than the object, relative to the robotic device using the first scene and the second scene, the second object obstructing a portion of a second one of the at least two distinct sections of the first back illumination image and the second object obstructing a portion of a second one of the at least four distinct sections of the second back illumination image.

In further examples, any of the compute nodes or devices discussed with reference to the present edge computing systems and environment may be fulfilled based on the components depicted in FIGS. 5A and 5B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 5A:
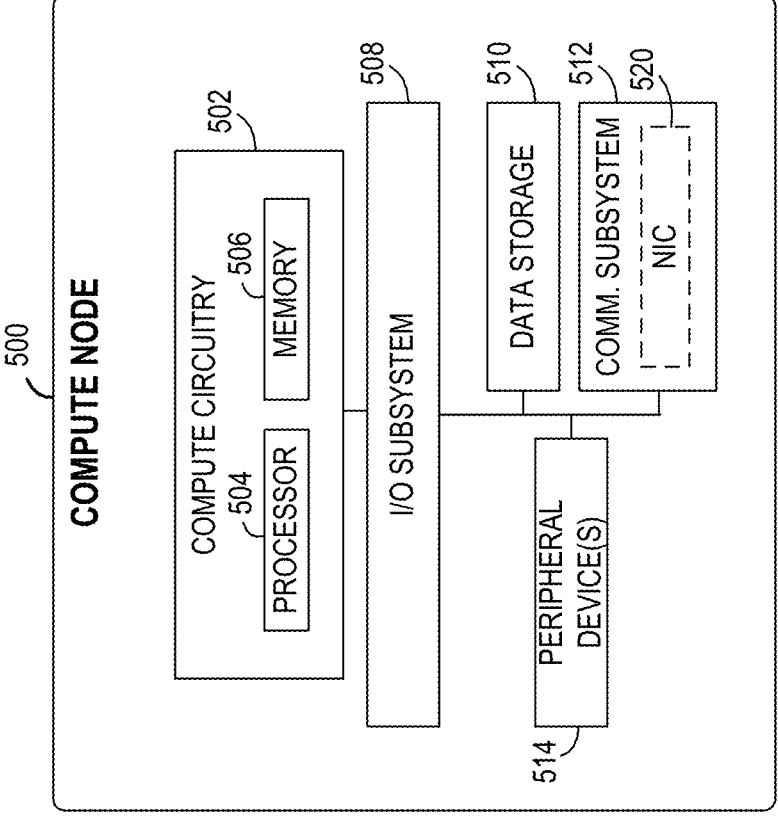
FIG. 5A provides an overview of example components for compute deployed at a compute node.

In the simplified example depicted in FIG. 5A, an edge compute node 500 includes a compute engine (also referred to herein as "compute circuitry") 502, an input/output (I/O) subsystem 508, data storage 510, a communication circuitry subsystem 512, and, optionally, one or more peripheral devices 514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 500 may be embodied as any type of engine, device, or collection of devices capable of performing various compute functions. In some examples, the compute node 500 may be embodied as a single device such as an integrated circuit, an embedded system, a field-programmable gate array (FPGA), a system-on-a-chip (SOC), or other integrated system or device. In the illustrative example, the compute node 500 includes or is embodied as a processor 504 and a memory 506. The processor 504 may be embodied as any type of processor capable of performing the functions described herein (e.g., executing an application). For example, the processor 504 may be embodied as a multi-core processor(s), a microcontroller, a processing unit, a specialized or special purpose processing unit, or other processor or processing/controlling circuit.

In some examples, the processor 504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 504 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 504 may work in coordination with each other to execute many types of operations and instructions within and on behalf of the compute node 500.

The memory 506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 506 may be integrated into the processor 504. The memory 506 may store various software and data used during operation such as one or more applications, data operated on by the application(s), libraries, and drivers.

The compute circuitry 502 is communicatively coupled to other components of the compute node 500 via the I/O subsystem 508, which may be embodied as circuitry and/or components to facilitate input/output operations with the compute circuitry 502 (e.g., with the processor 504 or the main memory 506) and other components of the compute circuitry 502. For example, the I/O subsystem 508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 508 may form a portion of a system-on-a-chip (SoC) and be incorporated, along with one or more of the processor 504, the memory 506, and other components of the compute circuitry 502, into the compute circuitry 502.

The one or more illustrative data storage devices 510 may be embodied as any type of devices configured for short-term or long-term storage of data such as, for example, memory devices and circuits, memory cards, hard disk drives, solid-state drives, or other data storage devices. Individual data storage devices 510 may include a system partition that stores data and firmware code for the data storage device 510. Individual data storage devices 510 may also include one or more operating system partitions that store data files and executables for operating systems depending on, for example, the type of compute node 500.

The communication circuitry 512 may be embodied as any communication circuit, device, or collection thereof, capable of enabling communications over a network between the compute circuitry 502 and another compute device (e.g., a gateway of an implementing computing system). The communication circuitry 512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 512 includes a network interface controller (NIC) 520, which may also be referred to as a host fabric interface (HFI). The NIC 520 may be embodied as one or more add-in-boards, daughter cards, network interface cards, controller chips, chipsets, or other devices that may be used by the compute node 500 to connect with another compute device (e.g., a gateway node). In some examples, the NIC 520 may be embodied as part of a system-on-a-chip (SoC) that includes one or more processors, or included on a multichip package that also contains one or more processors. In some examples, the NIC 520 may include a local processor (not shown) and/or a local memory (not shown) that are both local to the NIC 520. In such examples, the local processor of the NIC 520 may be capable of performing one or more of the functions of the compute circuitry 502 described herein. Additionally, or alternatively, in such examples, the local memory of the NIC 520 may be integrated into one or more components of the client compute node at the board level, socket level, chip level, or other levels.

Additionally, in some examples, a respective compute node 500 may include one or more peripheral devices 514. Such peripheral devices 514 may include any type of peripheral device found in a compute device or server such as audio input devices, a display, other input/output devices, interface devices, and/or other peripheral devices, depending on the particular type of the compute node 500. In further examples, the compute node 500 may be embodied by a respective compute node (whether a client, gateway, or aggregation node) in a computing system or like forms of appliances, computers, subsystems, circuitry, or other components.

Figure 5B:
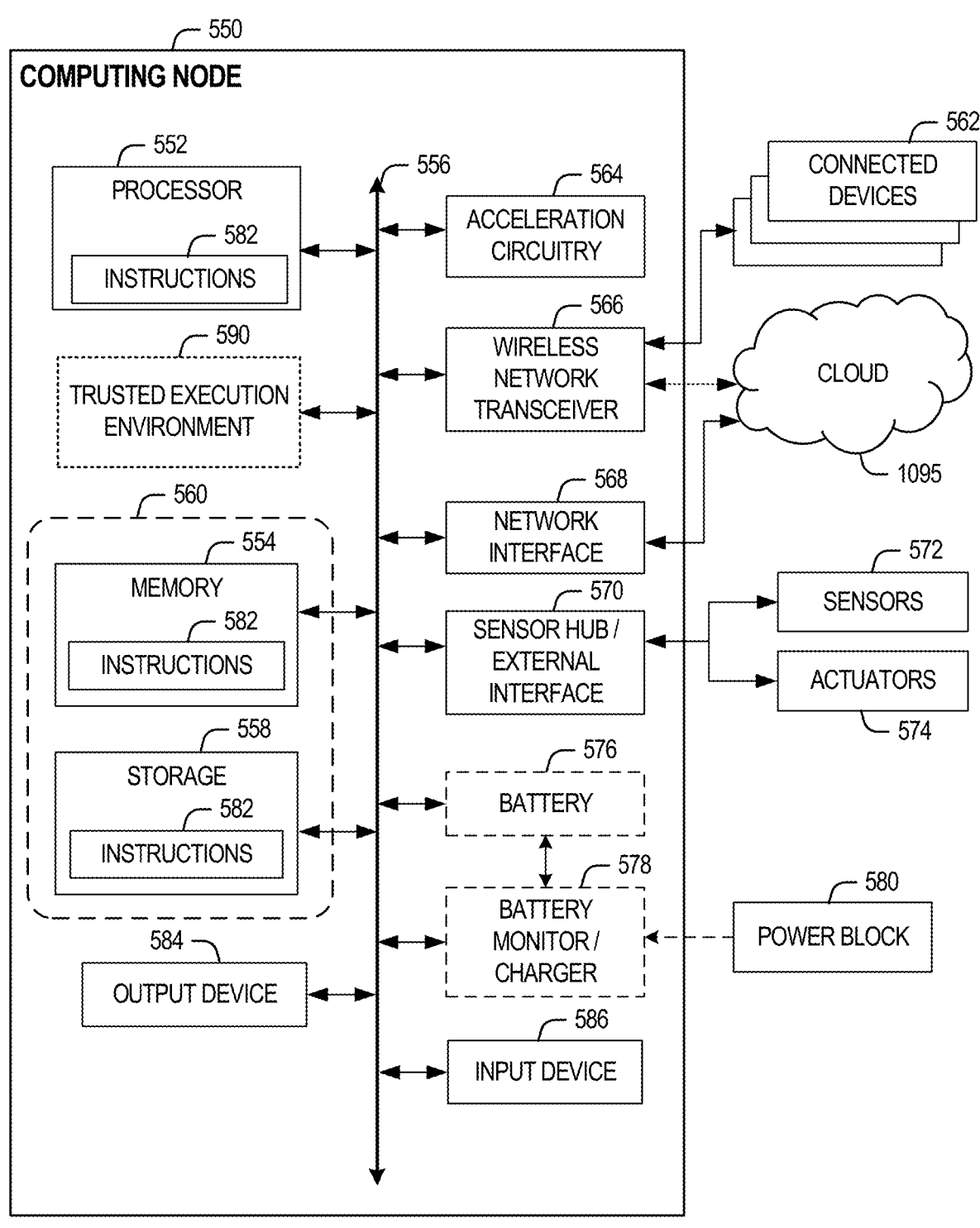
FIG. 5B provides a further overview of example components within a computing device.

In a more detailed example, FIG. 5B illustrates a block diagram of an example of components that may be present in a computing node 550 for implementing the techniques (e.g., operations, processes, methods, and methodologies) described herein. This computing node 550 provides a closer view of the respective components of node 500 when implemented as or as part of a computing device (e.g., as a mobile device, a base station, server, gateway, etc.). The computing node 550 may include any combinations of the hardware or logical components referenced herein, and it may include or couple with any device usable with an communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 550, or as components otherwise incorporated within a chassis of a larger system.

The computing device 550 may include processing circuitry in the form of a processor 552, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 552 may be a part of a system on a chip (SoC) in which the processor 552 and other components are formed into a single integrated circuit, or a single package, such as the Edison™ or Galileo™ SoC boards from Intel Corporation, Santa Clara, California. As an example, the processor 552 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 552 and accompanying circuitry may be provided in a single socket form factor, multiple socket form factor, or a variety of other formats, including in limited hardware configurations or configurations that include fewer than all elements shown in FIG. 5B.

The processor 552 may communicate with a system memory 554 over an interconnect 556 (e.g., a bus). Any number of memory devices may be used to provide for a given amount of system memory. As examples, the memory 554 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 558 may also couple to the processor 552 via the interconnect 556. In an example, the storage 558 may be implemented via a solid-state disk drive (SSDD). Other devices that may be used for the storage 558 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 558 may be on-die memory or registers associated with the processor 552. However, in some examples, the storage 558 may be implemented using a micro hard disk drive (HDD). Further, any number of new technologies may be used for the storage 558 in addition to, or instead of, the technologies described, such resistance change memories, phase change memories, holographic memories, or chemical memories, among others.

The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 556 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 556 may couple the processor 552 to a transceiver 566, for communications with the connected devices 562. The transceiver 566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 566 (or multiple transceivers) may communicate using multiple standards or radios for communications at a different range. For example, the computing node 550 may communicate with close devices, e.g., within about 10 meters, using a local transceiver based on Bluetooth Low Energy (BLE), or another low power radio, to save power. More distant connected devices 562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 566 (e.g., a radio transceiver) may be included to communicate with devices or services in the cloud 595 via local or wide area network protocols. The wireless network transceiver 566 may be a low-power wide-area (LPWA) transceiver that follows the IEEE 802.15.4, or IEEE 802.15.4g standards, among others. The computing node 550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 566, as described herein. For example, the transceiver 566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 568 may be included to provide a wired communication to nodes of the cloud 595 or to other devices, such as the connected devices 562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 568 may be included to enable connecting to a second network, for example, a first NIC 568 providing communications to the cloud over Ethernet, and a second NIC 568 providing communications to other devices over another type of network.

Given the variety of types of applicable communications from the device to another component or network, applicable communications circuitry used by the device may include or be embodied by any one or more of components 564, 566, 568, or 570. Accordingly, in various examples, applicable means for communicating (e.g., receiving, transmitting, etc.) may be embodied by such communications circuitry.

The computing node 550 may include or be coupled to acceleration circuitry 564, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 556 may couple the processor 552 to a sensor hub or external interface 570 that is used to connect additional devices or subsystems. The devices may include sensors 572, such as accelerometers, level sensors, flow sensors, optical light sensors, camera sensors, temperature sensors, global navigation system (e.g., GPS) sensors, pressure sensors, barometric pressure sensors, and the like. The hub or interface 570 further may be used to connect the computing node 550 to actuators 574, such as power switches, valve actuators, an audible sound generator, a visual warning device, and the like.

In some optional examples, various input/output (I/O) devices may be present within or connected to, the computing node 550. For example, a display or other output device 584 may be included to show information, such as sensor readings or actuator position. An input device 586, such as a touch screen or keypad may be included to accept input. An output device 584 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 550. A display or console hardware, in the context of the present system, may be used to provide output and receive input of an computing system; to manage components or services of a computing system; identify a state of a computing component or service; or to conduct any other number of management or administration functions or service use cases.

A battery 576 may power the computing node 550, although, in examples in which the computing node 550 is mounted in a fixed location, it may have a power supply coupled to an electrical grid, or the battery may be used as a backup or for temporary capabilities. The battery 576 may be a lithium ion battery, or a metal-air battery, such as a zinc-air battery, an aluminum-air battery, a lithium-air battery, and the like.

A battery monitor/charger 578 may be included in the computing node 550 to track the state of charge (SoCh) of the battery 576, if included. The battery monitor/charger 578 may be used to monitor other parameters of the battery 576 to provide failure predictions, such as the state of health (SoH) and the state of function (SoF) of the battery 576. The battery monitor/charger 578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 578 may communicate the information on the battery 576 to the processor 552 over the interconnect 556. The battery monitor/charger 578 may also include an analog-to-digital (ADC) converter that enables the processor 552 to directly monitor the voltage of the battery 576 or the current flow from the battery 576. The battery parameters may be used to determine actions that the computing node 550 may perform, such as transmission frequency, mesh network operation, sensing frequency, and the like.

A power block 580, or other power supply coupled to a grid, may be coupled with the battery monitor/charger 578 to charge the battery 576. In some examples, the power block 580 may be replaced with a wireless power receiver to obtain the power wirelessly, for example, through a loop antenna in the computing node 550. A wireless battery charging circuit, such as an LTC4020 chip from Linear Technologies of Milpitas, California, among others, may be included in the battery monitor/charger 578. The specific charging circuits may be selected based on the size of the battery 576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 558 may include instructions 582 in the form of software, firmware, or hardware commands to implement the techniques described herein. Although such instructions 582 are shown as code blocks included in the memory 554 and the storage 558, it may be understood that any of the code blocks may be replaced with hardwired circuits, for example, built into an application specific integrated circuit (ASIC).

In an example, the instructions 582 provided via the memory 554, the storage 558, or the processor 552 may be embodied as a non-transitory, machine-readable medium 560 including code to direct the processor 552 to perform electronic operations in the computing node 550. The processor 552 may access the non-transitory, machine-readable medium 560 over the interconnect 556. For instance, the non-transitory, machine-readable medium 560 may be embodied by devices described for the storage 558 or may include specific storage units such as optical disks, flash drives, or any number of other hardware devices. The non-transitory, machine-readable medium 560 may include instructions to direct the processor 552 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 582 on the processor 552 (separately, or in combination with the instructions 582 of the machine readable medium 560) may configure execution or operation of a trusted execution environment (TEE) 590. In an example, the TEE 590 operates as a protected area accessible to the processor 552 for secure execution of instructions and secure access to data. Various implementations of the TEE 590, and an accompanying secure area in the processor 552 or the memory 554 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 550 through the TEE 590 and the processor 552.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically program-mable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmis-sion medium via a network interface device utilizing any one of a number of transfer protocols (e.g., Hypertext Transfer Protocol (HTTP)).

A machine-readable medium may be provided by a stor-age device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The infor-mation representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or oth-erwise manipulating the information into the instructions.

In an example, the derivation of the instructions may include assembly, compilation, or interpretation of the infor-mation (e.g., by the processing circuitry) to create the instructions from some intermediate or preprocessed format provided by the machine-readable medium. The informa-tion, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation indepen-dence. Such components may be embodied by any number of software or hardware forms. For example, a component or module may be implemented as a hardware circuit compris-ing custom very-large-scale integration (VLSI) circuits or gate arrays, off-the-shelf semiconductors such as logic chips, transistors, or other discrete components. A component or module may also be implemented in programmable hard-ware devices such as field programmable gate arrays, pro-grammable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a net-work, using one or more platforms, wirelessly, via a soft-ware component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or com-binations with one or more of the other examples.

Example 1 is a system comprising: a robotic device; a display device to display a first back illumination image having at least two distinct sections and a second back illumination image having at least four distinct sections; a camera to capture a first scene including the first back illumination image and an object obstructing a portion of one of the at least two distinct sections of the first back illumination image and a second scene including the second back illumination image and the object obstructing a portion of one of the at least four distinct sections of the second back illumination image; processing circuitry; and memory including instructions, which when executed by the process-ing circuitry cause the processing circuitry to: identify, using an orientation of the display screen relative to the camera obtained via calibration, first location information of the object relative to the robotic device based on the first scene and the one of the at least two distinct sections; identify, using the orientation of the display screen relative to the camera obtained via the calibration, second location infor-mation of the object relative to the robotic device based on the second scene and the one of the at least four distinct sections; determine a location of the object relative to the robotic device using the first location information and the second location information; and output information corresponding to the location of the object to the robotic device.

In Example 2, the subject matter of Example 1 includes, wherein: the display device is further to display a calibration image; the camera is further to capture a third scene including the robotic device, the calibration image, and the object obstructing a first portion of the calibration image; and wherein to determine the orientation, the instructions are further to cause the processing circuitry to determine the orientation of the display screen relative to the camera based on a second portion of the calibration image that is unobstructed.

In Example 3, the subject matter of Example 2 includes, wherein the instructions further cause the processing circuitry to recalibrate the camera to the display device based on a second calibration image displayed by the display device, a second scene captured by the camera including the second calibration image and a second object obstructing a third portion of the second calibration image, and a determination by the processing circuitry of a second orientation of the display screen relative to the camera based on a fourth portion of the second calibration image that is unobstructed.

In Example 4, the subject matter of Examples 1-3 includes, wherein the at least two distinct sections and the at least four distinct sections include a binary encoding.

In Example 5, the subject matter of Examples 1-4 includes, wherein the instructions further cause the processing circuitry to determine the location of the object using third location information of the object relative to the robotic device based on a third scene including a third back illumination image and the object obstructing a portion of one of at least eight distinct sections of the third back illumination image.

In Example 6, the subject matter of Examples 1-5 includes, wherein the instructions further cause the processing circuitry to determine a location of a second object, having a different size than the object, relative to the robotic device using the first scene and the second scene, the second object obstructing a portion of a second one of the at least two distinct sections of the first back illumination image and the second object obstructing a portion of a second one of the at least four distinct sections of the second back illumination image.

In Example 7, the subject matter of Examples 1-6 includes, wherein the robotic device is a collaborative robotic device including at least one safety control for interacting in a human-robotic shared workspace.

Example 8 is a system comprising: a robotic device; a display device to display a calibration image; a camera to capture a scene including the robotic device, the calibration image, and an object obstructing a first portion of the calibration image; processing circuitry; and memory including instructions, which when executed by the processing circuitry cause the processing circuitry to: determine an orientation of the display screen relative to the camera based on a second portion of the calibration image that is unobstructed; identify a location of the object relative to the robotic device based on the orientation; and output information corresponding to the location of the object to the robotic device.

In Example 9, the subject matter of Example 8 includes, wherein the robotic device is a collaborative robotic device including at least one safety control for interacting in a human-robotic shared workspace.

In Example 10, the subject matter of Examples 8-9 includes, wherein the camera is located at least ten meters away from the display device.

In Example 11, the subject matter of Examples 8-10 includes, wherein the instructions further cause the processing circuitry to recalibrate the camera to the display device based on a second calibration image displayed by the display device, a second scene captured by the camera including the second calibration image and a second object obstructing a third portion of the second calibration image, and a determination by the processing circuitry of a second orientation of the display screen relative to the camera based on a fourth portion of the second calibration image that is unobstructed.

In Example 12, the subject matter of Examples 8-11 includes, wherein to identify a location of the object relative to the robotic device, the instructions further cause the processing circuitry to: identify, using the orientation, first location information of the object relative to the robotic device based on a first scene captured by the camera, the first scene including a first back illumination image displayed by the display device and the object obstructing a portion of one of at least two distinct sections of the first back illumination image; and identify, using the orientation, second location information of the object relative to the robotic device based on a second scene captured by the camera, the second scene including a second back illumination image displayed by the display device and the object obstructing a portion of one of at least four distinct sections of the second back illumination image.

Example 13 is a method comprising: displaying, at a display device, a first back illumination image having at least two distinct sections and a second back illumination image having at least four distinct sections; capturing a first scene including the first back illumination image and an object obstructing a portion of one of the at least two distinct sections of the first back illumination image; capturing a second scene including the second back illumination image and the object obstructing a portion of one of the at least four distinct sections of the second back illumination image; identifying, using an orientation of the display screen relative to the camera obtained via calibration, first location information of the object relative to a robotic device based on the first scene and the one of the at least two distinct sections; identifying, using the orientation of the display screen relative to the camera obtained via the calibration, second location information of the object relative to the robotic device based on the second scene and the one of the at least four distinct sections; determining a location of the object relative to the robotic device using the first location information and the second location information; and outputting information corresponding to the location of the object to the robotic device.

In Example 14, the subject matter of Example 13 includes, displaying a calibration image; capturing a third scene including the robotic device, the calibration image, and the object obstructing a first portion of the calibration image; and wherein determining the orientation includes determining the orientation of the display screen relative to the camera based on a second portion of the calibration image that is unobstructed.

In Example 15, the subject matter of Example 14 includes, recalibrating the camera to the display device by: displaying a second calibration image; capturing a second scene including the second calibration image and a second object obstructing a third portion of the second calibration image; and determining a second orientation of the display screen relative to the camera based on a fourth portion of the second calibration image that is unobstructed.

In Example 16, the subject matter of Examples 13-15 includes, wherein the at least two distinct sections and the at least four distinct sections include a binary encoding.

In Example 17, the subject matter of Examples 13-16 includes, wherein determining the location of the object includes using third location information of the object relative to the robotic device based on a third scene including a third back illumination image and the object obstructing a portion of one of at least eight distinct sections of the third back illumination image.

In Example 18, the subject matter of Examples 13-17 includes, determining a location of a second object, having a different size than the object, relative to the robotic device using the first scene and the second scene, the second object obstructing a portion of a second one of the at least two distinct sections of the first back illumination image and the second object obstructing a portion of a second one of the at least four distinct sections of the second back illumination image.

Example 19 is at least one machine-readable medium including instructions, which when executed by processing circuitry, cause the processing circuitry to perform operations to: cause display, at a display device, of a first back illumination image having at least two distinct sections and a second back illumination image having at least four distinct sections; receive an image of a first scene, captured by a camera, including the first back illumination image and an object obstructing a portion of one of the at least two distinct sections of the first back illumination image; receive an image of a second scene, captured by the camera, including the second back illumination image and the object obstructing a portion of one of the at least four distinct sections of the second back illumination image; identify, using an orientation of the display screen relative to the camera obtained via calibration, first location information of the object relative to a robotic device based on the first scene and the one of the at least two distinct sections; identify, using the orientation of the display screen relative to the camera obtained via the calibration, second location information of the object relative to the robotic device based on the second scene and the one of the at least four distinct sections; determine a location of the object relative to the robotic device using the first location information and the second location information; and output information corresponding to the location of the object to the robotic device.

In Example 20, the subject matter of Example 19 includes, wherein the instructions further cause the processing circuitry to: cause a calibration image to be displayed; and receive an image of a third scene, captured by the camera, including the robotic device, the calibration image, and the object obstructing a first portion of the calibration image; and wherein to determine the orientation, the instructions are further to cause the processing circuitry to determine the orientation of the display screen relative to the camera based on a second portion of the calibration image that is unobstructed.

In Example 21, the subject matter of Example 20 includes, wherein the instructions further cause the processing circuitry to recalibrate the camera to the display device based on a second calibration image displayed by the display device, a second scene captured by the camera including the second calibration image and a second object obstructing a third portion of the second calibration image, and a determination by the processing circuitry of a second orientation of the display screen relative to the camera based on a fourth portion of the second calibration image that is unobstructed.

In Example 22, the subject matter of Examples 19-21 includes, wherein the at least two distinct sections and the at least four distinct sections include a binary encoding.

In Example 23, the subject matter of Examples 19-22 includes, wherein the instructions further cause the processing circuitry to determine the location of the object using third location information of the object relative to the robotic device based on a third scene including a third back illumination image and the object obstructing a portion of one of at least eight distinct sections of the third back illumination image.

In Example 24, the subject matter of Examples 19-23 includes, wherein the instructions further cause the processing circuitry to determine a location of a second object, having a different size than the object, relative to the robotic device using the first scene and the second scene, the second object obstructing a portion of a second one of the at least two distinct sections of the first back illumination image and the second object obstructing a portion of a second one of the at least four distinct sections of the second back illumination image.

In Example 25, the subject matter of Examples 19-24 includes, wherein the robotic device is a collaborative robotic device including at least one safety control for interacting in a human-robotic shared workspace.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-25, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an edge node configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-25, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-25 or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system comprising:
a collaborative robotic device including at least one safety control for interacting in a human-robotic shared workspace;
a display screen positioned within the human-robotic shared workspace to display a calibration image;
a camera to capture a scene including the collaborative robotic device, the calibration image, and an object obstructing a first portion of the calibration image;
processing circuitry; and
memory including instructions, which when executed by the processing circuitry cause the processing circuitry to:

determine an orientation of the display screen relative to the camera based on a second portion of the calibration image that is unobstructed;

identify a spatial location of the object within the human-robotic shared workspace relative to the collaborative robotic device based on the orientation; and output information corresponding to the spatial location of the object to the collaborative robotic device for controlling operation of the collaborative robotic device within the human-robotic shared workspace.

2. The system of claim 1, wherein the camera is located at least ten meters away from the display screen.

3. The system of claim 1, wherein the instructions further cause the processing circuitry to recalibrate the camera to the display screen based on a second calibration image displayed by the display screen, a second scene captured by the camera including the second calibration image and a second object obstructing a third portion of the second calibration image, and a determination by the processing circuitry of a second orientation of the display screen relative to the camera based on a fourth portion of the second calibration image that is unobstructed.

4. The system of claim 1, wherein to identify a location of the object relative to the collaborative robotic device, the instructions further cause the processing circuitry to:

identify, using the orientation, first location information of the object relative to the collaborative robotic device based on a first scene captured by the camera, the first scene including a first back illumination image displayed by the display screen and the object obstructing a portion of one of at least two distinct sections of the first back illumination image; and identify, using the orientation, second location information of the object relative to the collaborative robotic device based on a second scene captured by the camera, the second scene including a second back illumination image displayed by the display screen and the object obstructing a portion of one of at least four distinct sections of the second back illumination image.

5. A system comprising:

a collaborative robotic device including at least one safety control for interacting in a human-robotic shared workspace;

a display device positioned within the human-robotic shared workspace to display a first back illumination image having at least two distinct sections and a second back illumination image having at least four distinct sections;

a camera to capture a first scene including the first back illumination image and an object obstructing a portion of one of the at least two distinct sections of the first back illumination image and a second scene including the second back illumination image and the object obstructing a portion of one of the at least four distinct sections of the second back illumination image; and processing circuitry to:

identify, using an orientation of the display device relative to the camera obtained via calibration, first location information of the object within the human-robotic shared workspace relative to the collaborative robotic device based on the first scene and the one of the at least two distinct sections;

identify, using the orientation of the display device relative to the camera obtained via the calibration, second location information of the object within the human-robotic shared workspace relative to the collaborative robotic device based on the second scene and the one of the at least four distinct sections;

determine a spatial location of the object within the human-robotic shared workspace relative to the collaborative robotic device using the first location information and the second location information; and output information corresponding to the spatial location of the object to the collaborative robotic device for controlling operation of the collaborative robotic device within the human-robotic shared workspace.

6. The system of claim 5, wherein:

the display device is further to display a calibration image;

the camera is further to capture a third scene including the collaborative robotic device, the calibration image, and the object obstructing a first portion of the calibration image; and wherein to determine the orientation, includes the processing circuitry to determine the orientation of the display device relative to the camera based on a second portion of the calibration image that is unobstructed.

7. The system of claim 6, wherein the processing circuitry is further to recalibrate the camera to the display device based on a second calibration image displayed by the display device, a second scene captured by the camera including the second calibration image and a second object obstructing a third portion of the second calibration image, and a determination by the processing circuitry of a second orientation of the display device relative to the camera based on a fourth portion of the second calibration image that is unobstructed.

8. The system of claim 5, wherein the at least two distinct sections and the at least four distinct sections include a binary encoding.

9. The system of claim 5, wherein the processing circuitry is further to determine the location of the object using third location information of the object relative to the collaborative robotic device based on a third scene including a third back illumination image and the object obstructing a portion of one of at least eight distinct sections of the third back illumination image.

10. The system of claim 5, wherein the processing circuitry is further to determine a location of a second object, having a different size than the object, relative to the collaborative robotic device using the first scene and the second scene, the second object obstructing a portion of a second one of the at least two distinct sections of the first back illumination image and the second object obstructing a portion of a second one of the at least four distinct sections of the second back illumination image.

11. An apparatus comprising:

means for causing display, at a display screen positioned within a human-robotic shared workspace, of a first back illumination image having at least two distinct sections and a second back illumination image having at least four distinct sections;

means for receiving a first scene including the first back illumination image and an object obstructing a portion of one of the at least two distinct sections of the first back illumination image;

means for receiving a second scene including the second back illumination image and the object obstructing a portion of one of the at least four distinct sections of the second back illumination image;

means for identifying, using an orientation of the display screen relative to a camera obtained via calibration, first location information of the object within the human-robotic shared workspace relative to a collaborative robotic device including at least one safety control for interacting in the human-robotic shared workspace based on the first scene and the one of the at least two distinct sections;

means for identifying, using the orientation of the display screen relative to the camera obtained via the calibration, second location information of the object within the human-robotic shared workspace relative to the collaborative robotic device based on the second scene and the one of the at least four distinct sections;

means for determining a spatial location of the object within the human-robotic shared workspace relative to the collaborative robotic device using the first location information and the second location information; and means for outputting information corresponding to the spatial location of the object to the collaborative robotic device for controlling operation of the collaborative robotic device within the human-robotic shared workspace.

12. The apparatus of claim 11, further comprising:

means for displaying a calibration image;

means for capturing a third scene including the collaborative robotic device, the calibration image, and the object obstructing a first portion of the calibration image; and wherein determining the orientation includes determining the orientation of the display screen relative to the camera based on a second portion of the calibration image that is unobstructed.

13. The apparatus of claim 12, further comprising recalibrating the camera to the display screen by:

displaying a second calibration image;

capturing a second scene including the second calibration image and a second object obstructing a third portion of the second calibration image; and determining a second orientation of the display screen relative to the camera based on a fourth portion of the second calibration image that is unobstructed.

14. The apparatus of claim 11, wherein the at least two distinct sections and the at least four distinct sections include a binary encoding.

15. The apparatus of claim 11, wherein determining the location of the object includes using third location information of the object relative to the collaborative robotic device based on a third scene including a third back illumination image and the object obstructing a portion of one of at least eight distinct sections of the third back illumination image.

16. The apparatus of claim 11, further comprising means for determining a location of a second object, having a different size than the object, relative to the collaborative robotic device using the first scene and the second scene, the second object obstructing a portion of a second one of the at least two distinct sections of the first back illumination image and the second object obstructing a portion of a second one of the at least four distinct sections of the second back illumination image.

17. At least one non-transitory machine-readable medium including instructions, which when executed by processing circuitry, cause the processing circuitry to perform operations to:

cause display, at a display screen positioned within a human-robotic shared workspace, of a first back illumination image having at least two distinct sections and a second back illumination image having at least four distinct sections;

receive an image of a first scene, captured by a camera, including the first back illumination image and an object obstructing a portion of one of the at least two distinct sections of the first back illumination image;

receive an image of a second scene, captured by the camera, including the second back illumination image and the object obstructing a portion of one of the at least four distinct sections of the second back illumination image;

identify, using an orientation of the display screen relative to the camera obtained via calibration, first location information of the object within the human-robotic shared workspace relative to a collaborative robotic device including at least one safety control for interacting in the human-robotic shared workspace based on the first scene and the one of the at least two distinct sections;

identify, using the orientation of the display screen relative to the camera obtained via the calibration, second location information of the object within the human-robotic shared workspace relative to the collaborative robotic device based on the second scene and the one of the at least four distinct sections;

determine a spatial location of the object within the human-robotic shared workspace relative to the collaborative robotic device using the first location information and the second location information; and output information corresponding to the spatial location of the object to the collaborative robotic device for controlling operation of the collaborative robotic device within the human-robotic shared workspace.

18. The at least one machine-readable medium of claim 17, wherein the instructions further cause the processing circuitry to:

cause a calibration image to be displayed; and receive an image of a third scene, captured by the camera, including the collaborative robotic device, the calibration image, and the object obstructing a first portion of the calibration image; and wherein to determine the orientation, the instructions are further to cause the processing circuitry to determine the orientation of the display screen relative to the camera based on a second portion of the calibration image that is unobstructed.

19. The at least one machine-readable medium of claim 18, wherein the instructions further cause the processing circuitry to recalibrate the camera to the display screen based on a second calibration image displayed by the display screen, a second scene captured by the camera including the second calibration image and a second object obstructing a third portion of the second calibration image, and a determination by the processing circuitry of a second orientation of the display screen relative to the camera based on a fourth portion of the second calibration image that is unobstructed.

20. The at least one machine-readable medium of claim 17, wherein the at least two distinct sections and the at least four distinct sections include a binary encoding.

21. The at least one machine-readable medium of claim 17, wherein the instructions further cause the processing circuitry to determine the location of the object using third location information of the object relative to the collaborative robotic device based on a third scene including a third back illumination image and the object obstructing a portion of one of at least eight distinct sections of the third back illumination image.

22. The at least one machine-readable medium of claim 17, wherein the instructions further cause the processing circuitry to determine a location of a second object, having a different size than the object, relative to the collaborative robotic device using the first scene and the second scene, the second object obstructing a portion of a second one of the at least two distinct sections of the first back illumination image and the second object obstructing a portion of a second one of the at least four distinct sections of the second back illumination image.

\*  \*  \*  \*  \*